(12) United States Patent
Lin

(10) Patent No.: US 7,566,199 B2
(45) Date of Patent: Jul. 28, 2009

(54) TURBO PNEUMATIC CYLINDER OF PNEUMATIC TOOL

(75) Inventor: Freddy Lin, Taichung Hsien (TW)

(73) Assignee: Gison Machinery Co., Ltd., Taichung Hsien (TW)

( * ) Notice: Subject to any disclaimer, the term of this patent is extended or adjusted under 35 U.S.C. 154(b) by 553 days.

(21) Appl. No.: 11/486,317

(22) Filed: Jul. 14, 2006

(65) Prior Publication Data

US 2008/0014086 A1   Jan. 17, 2008

(51) Int. Cl.
*F01D 1/26* (2006.01)

(52) U.S. Cl. .................... 415/68; 415/199.4; 415/904; 416/128

(58) Field of Classification Search ............... 415/904, 415/199.4, 35, 80, 81, 62; 416/120, 124, 416/128

See application file for complete search history.

(56) References Cited

U.S. PATENT DOCUMENTS 3,635,576 A  *  1/1972  Wieckmann ............... 415/68

* cited by examiner

*Primary Examiner*—Richard Edgar
(74) *Attorney, Agent, or Firm*—Troxell Law Office, PLLC

(57) ABSTRACT

A turbo pneumatic cylinder of a pneumatic tool, including a front turbine, a one-way rotatable inverse turbine and a rear turbine. The front and rear turbines are mounted on the rotary shaft of the pneumatic cylinder. The inverse turbine is one-way rotatably fitted on the rotary shaft between the front and rear turbines. Multiple blades are arranged on the circumferences of the front and rear turbine and the inverse turbines. The blades of the inverse turbine are directed in a direction reverse to the direction of the blades of the front and rear turbines. The front and rear turbines and the rotary shaft rotate in the same direction, while the inverse turbine rotates in a direction reverse to the direction of the front and rear turbines. As a result, the efficiency of the pneumatic cylinder is enhanced and the twisting of the pneumatic cylinder is avoided when it is in operation.

11 Claims, 5 Drawing Sheets

TURBO PNEUMATIC CYLINDER OF PNEUMATIC TOOL

BACKGROUND OF THE INVENTION

The present invention is related to a pneumatic tool, and more particularly to a turbo pneumatic cylinder of a pneumatic tool, which can output maximum torque at lowest gas consumption.

High-pressure gas serves as the power source of a pneumatic tool, and drives a pneumatic cylinder to operate the pneumatic tool. In a conventional turbo pneumatic cylinder, after the high-pressure gas flows into the pneumatic cylinder, the high-pressure gas simply drives the turbine to rotate and then is exhausted from the pneumatic cylinder. The turbo pneumatic cylinder can output a certain power, however, when the airflow flows within the conventional turbo pneumatic cylinder, the kinetic energy is not effectively increased. Therefore, the output power is limited. Also, the gas consumption of the conventional turbo pneumatic cylinder is great so that a considerable amount of energy is waste.

Furthermore, when the turbine of the turbo pneumatic cylinder operates at high rotational speed, the large angular moment will lead to spin effect (gyroscope effect). Accordingly, the rotary shaft of the pneumatic cylinder will be constantly directed in a fixed direction. Therefore, when a user holds the pneumatic tool, the user will feel that the pneumatic tool itself keeps twisting in a certain direction. Under such circumstance, the user needs to apply a force to the pneumatic tool to steadily hold the same. As a result, the user is easy to feel exhausted after a period of operation.

SUMMARY OF THE INVENTION

It is therefore a primary object of the present invention to provide a turbo pneumatic cylinder of a pneumatic tool, which can output large torque.

It is a further object of the present invention to provide the above turbo pneumatic cylinder of the pneumatic tool, which can output power at low gas consumption.

It is still a further object of the present invention to provide the above turbo pneumatic cylinder of the pneumatic tool, the rotating elements of which maintain balance at high speed rotation without creating spin effect (gyroscope effect).

The present invention can be best understood through the following description and accompanying drawings wherein:

DETAILED DESCRIPTION OF THE PREFERRED EMBODIMENTS

Figure 2:
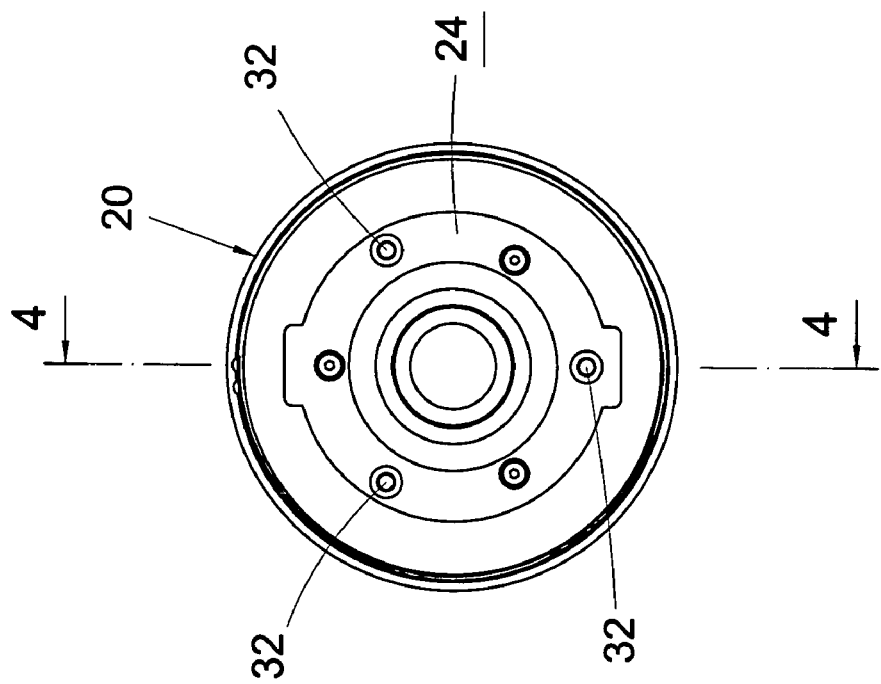
FIG. 2 is a front end view of FIG. 1.
Figure 1:
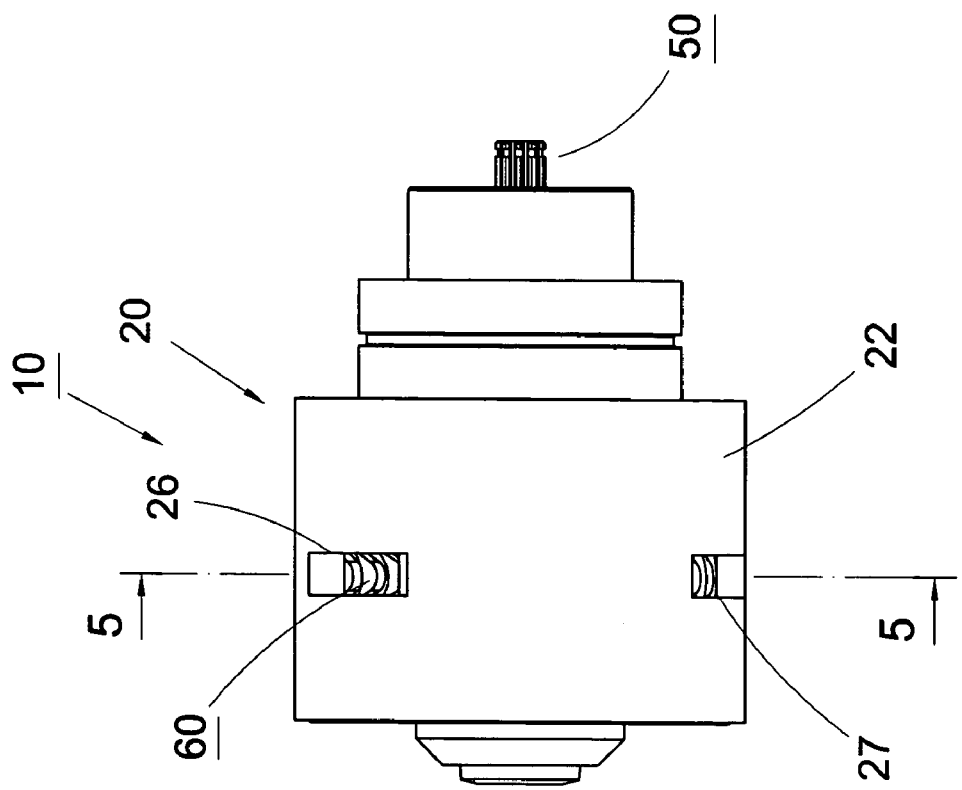
FIG. 1 is a side view of a preferred embodiment of the present invention.
Figure 4:
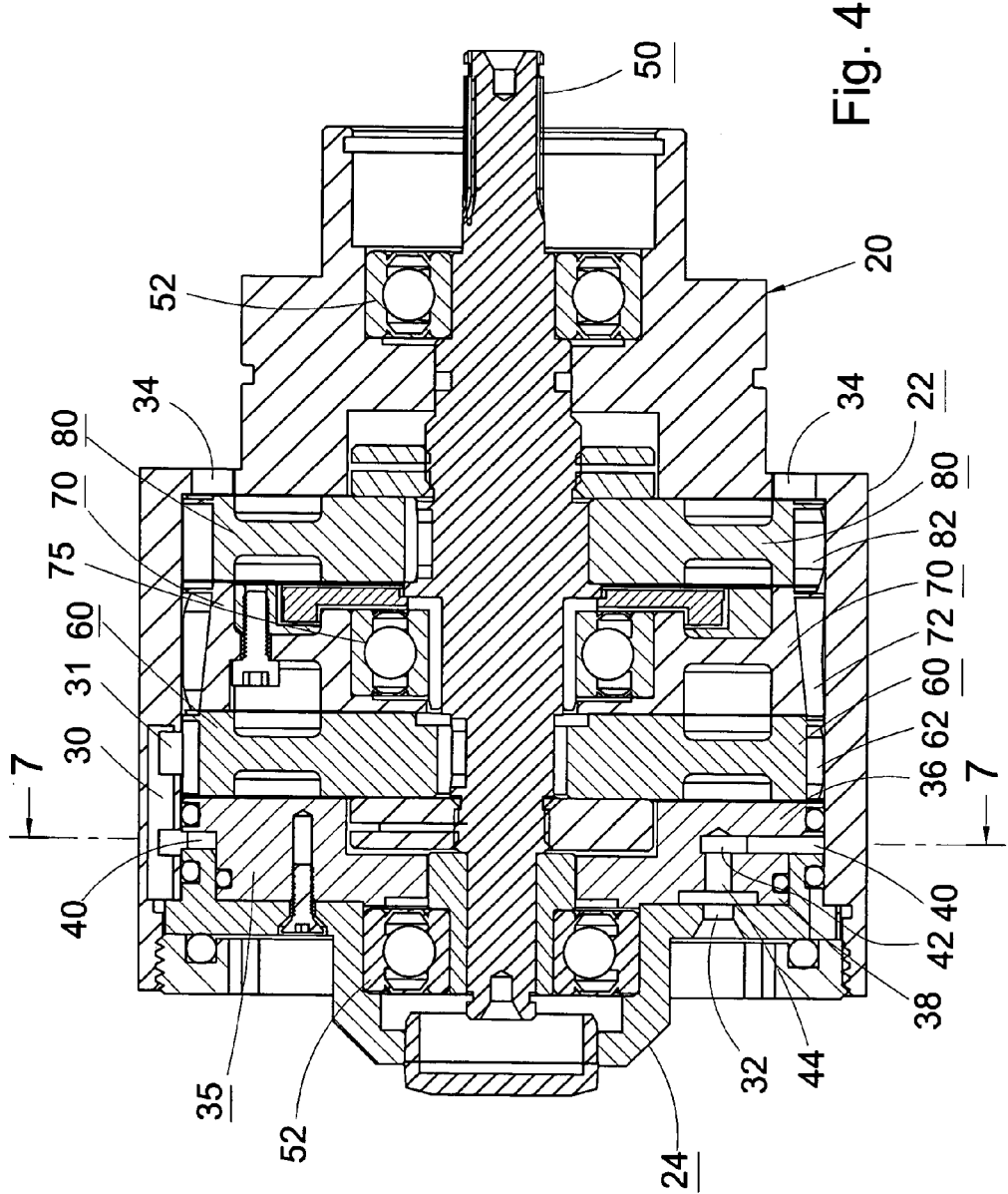
FIG. 4 is a sectional view taken along line 4-4 of FIG. 2.
Figure 6:
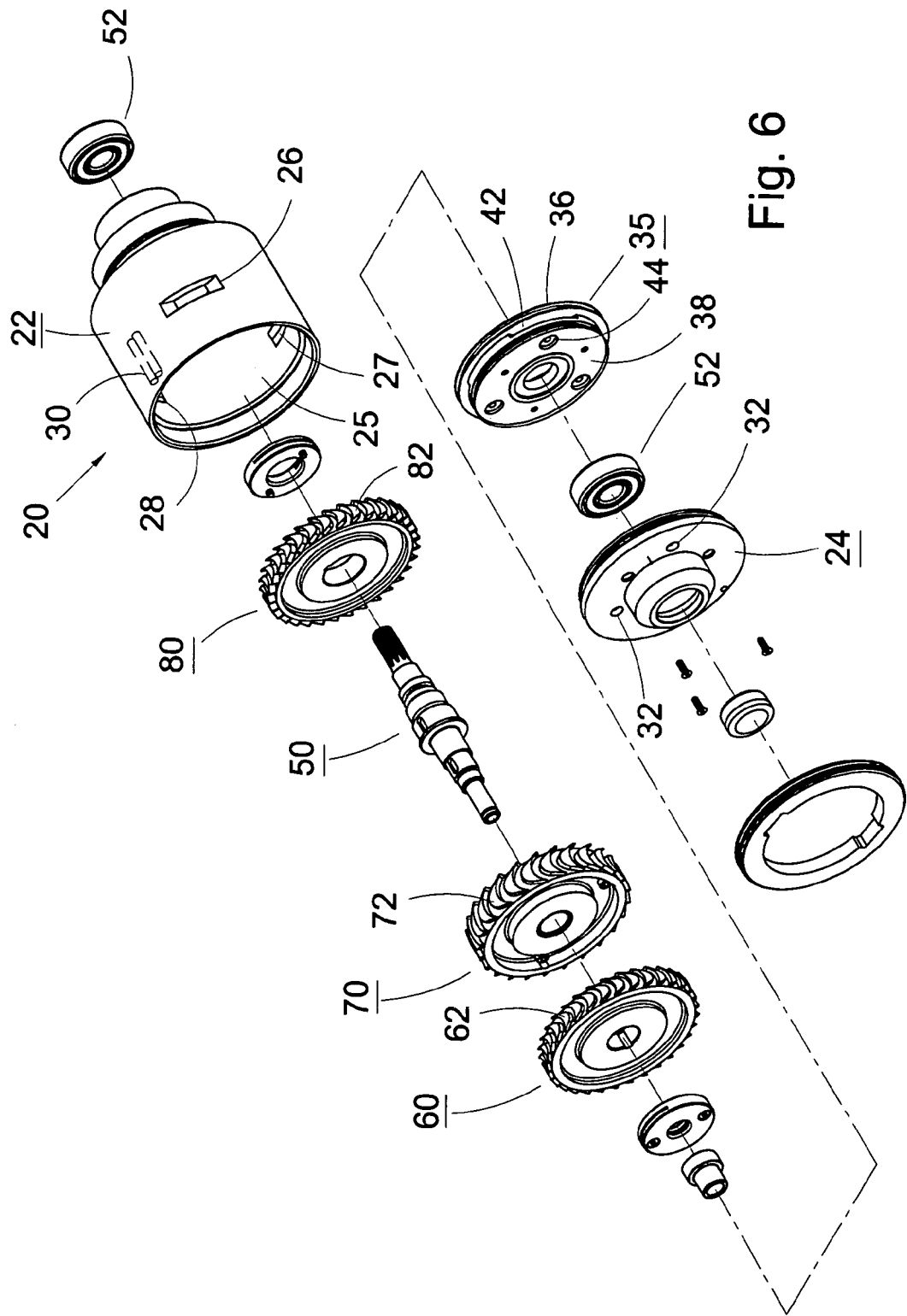
FIG. 6 is a perspective exploded view of FIG. 1.

Please refer to FIGS. 1, 4 and 6. A preferred embodiment of the turbo pneumatic cylinder 10 of the present invention includes a cylinder housing 20, two turbines 60, 80 and a one-way rotatable inverse turbine 70 disposed in the cylinder housing 20.

Figure 5:
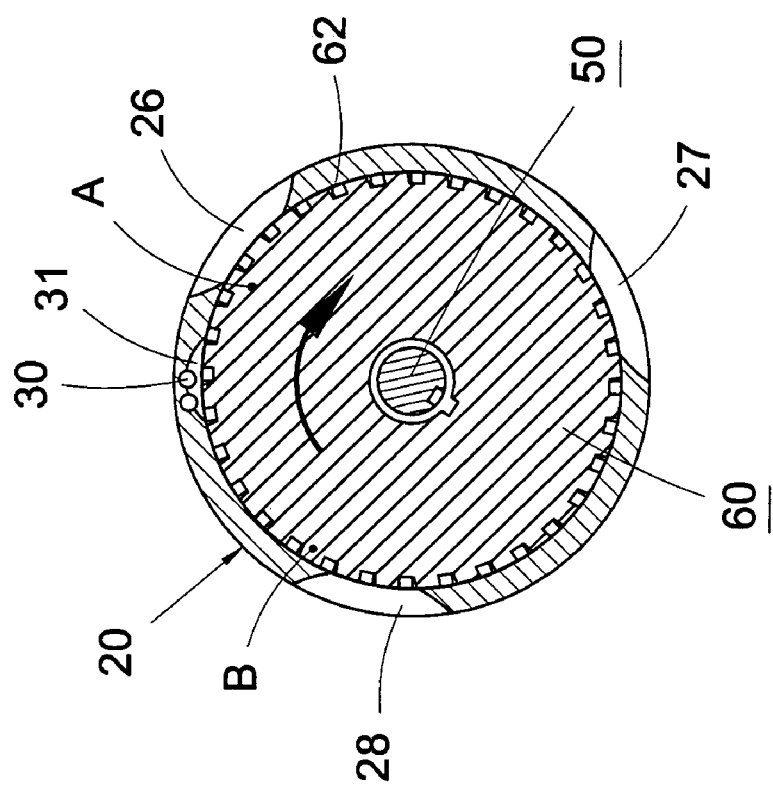
FIG. 5 is a sectional view taken along line 5-5 of FIG. 1.

The cylinder housing 20 is composed of a cylinder body 22 and a cylinder cap 24 plugged in a front end of the cylinder body 22. A cylinder chamber 25 is formed in the cylinder housing 20. A wall of the cylinder body 22 is formed with an intake 26 and two exhaust ports 27, 28 for communicating the cylinder chamber 25 with outer side. Preferably, the intake 26 and the exhaust ports 27, 28 are positioned on the same circumference of the cylinder body 22. An inner face of the wall of the cylinder chamber 25 is formed with a flow way 30 between the intake 26 and the exhaust port 28. In this embodiment, the flow way is composed of two axial channels. The end of the flow way 30 is formed with a crescent guide opening 31 as shown in FIG. 5.

Figure 3:
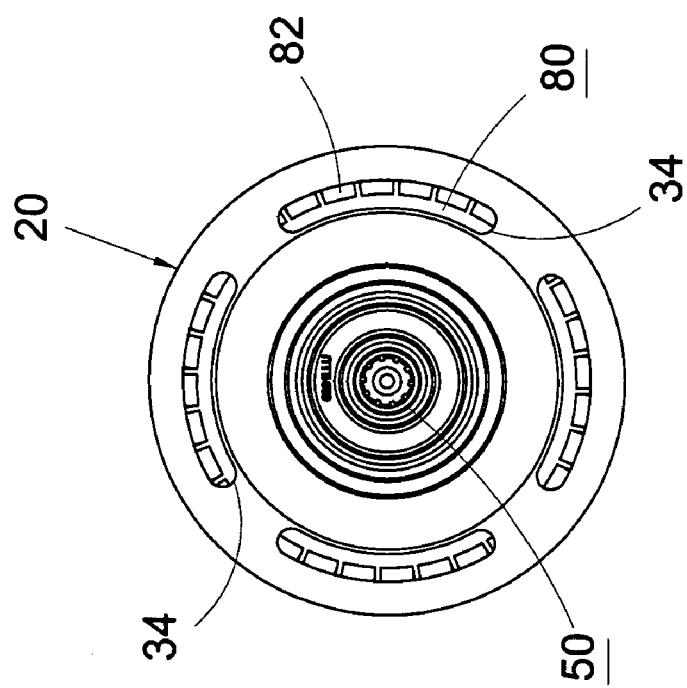
FIG. 3 is a rear end view of FIG. 1.

The cylinder cap 24 is formed with several intakes 32 through which the high-pressure gas can flow into the cylinder chamber 25. The rear end of the cylinder body 22 is formed with several exhaust ports 34 as shown in FIG. 3.

Figure 7:
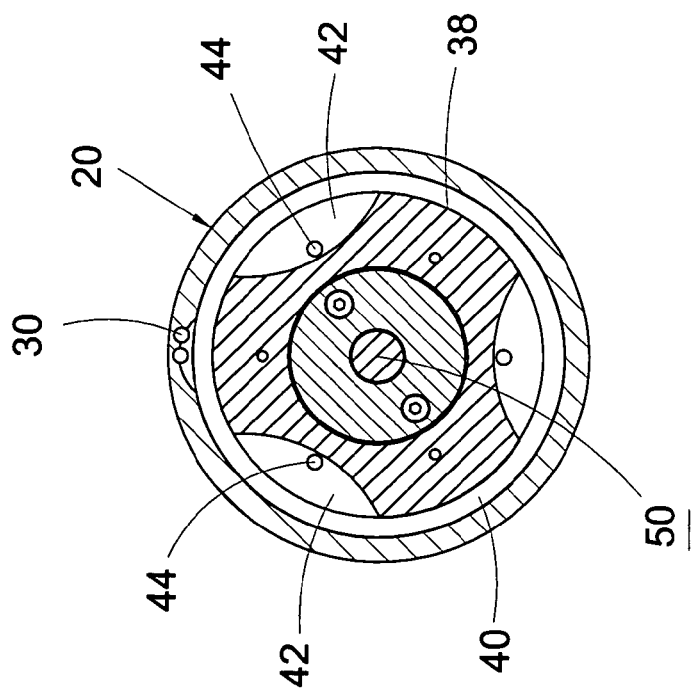
FIG. 7 is a sectional view taken along line 7-7 of FIG. 4.

In addition, a flow deflector 35 is fixed at the rear end of the cylinder cap 24 by screws for communicating the intakes 32 with the flow way 30. Referring to FIGS. 6 and 7, the flow deflector 35 has a disc section 36 and a cylindrical section 38 positioned on a front face of the disc section 36 and having a smaller diameter. The disc section 36 airtight abuts against inner face of the wall of the cylinder chamber 25 as shown in FIG. 4. The cylindrical section 38 and the cylinder chamber 25 define therebetween an annular space 40 communicating with the flowway 30. A circumference of the cylindrical section 38 is formed with three radially inward depressions 42. Three guide holes 44 are formed on the front end face of the cylindrical section 38 to inward extend and communicate with the three depressions 42. The front ends of the three guide holes 44 are right aligned with the intakes 32 as shown in FIG. 4. Accordingly, after the high-pressure gas flows into the intakes 32 of the cylinder cap 24, the gas flows through the guide holes 44 of the flow deflector 35 to fill up the annular space 40. Then the gas flows from the flow way 30 into the cylinder chamber 25. The way how the high-pressure gas is conducted from the intakes into the cylinder chamber is not limited to the embodiment.

A rotary shaft 50 is mounted in the cylinder housing 20 via two bearings 52. The rear bearing is fixed at the rear end of the cylinder body 22, while the front bearing is fixed at the cylinder cap 24.

Multiple U-shaped or crescent blades 62, 82 are arranged on the circumferences of the front turbine 60 and the rear turbine 80 at equal intervals.

Multiple blades 72 are arranged on the circumference of the inverse turbine 70 at equal intervals. The blades 72 have a configuration contrary to that of the blades 62, 82. The mass of the inverse turbine 70 is preferably equal to the sum of the masses of the turbine 60 and the turbine 80.

The turbines 60, 70, 80 are installed on the rotary shaft 50 and arranged within the cylinder chamber 25 with the inverse turbine 70 positioned between the front and rear turbines 60, 80. The front and rear turbines 60, 80 are fixed on the rotary shaft 50 and synchronously rotatable therewith. A one-way bearing 75 is mounted in the shaft hole of the inverse turbine 70 as shown in FIG. 4. The rotary shaft 50 is fitted through the one-way bearing 75, whereby the inverse turbine 70 can only one-way rotate about the rotary shaft in a direction reverse to the direction of the turbines 60, 80. This will be described hereinafter.

The front turbine 60 is mounted in a position at the rear end of the flow way 30, where the intake 26 and the exhaust ports 27, 28 are formed as shown in FIG. 5.

In addition, referring to FIG. 4, the heights of the blades 62, 72, 82 are gradually increased from front side to rear side, that is, the heights of the blades 62 of the front turbine are lowest, while that of the blades 82 of the rear turbine are highest. In addition, in this embodiment, the depths of the blades 72 of the inverse turbine are inclined, that is, the depths of the blades 72 are gradually increased from front side to rear side. Similarly, the depths of the blades 62, 82 can be increased. In this case, the blades, 62, 72, 82 are continuously beveled.

The pneumatic cylinder of the present invention is mounted in a housing of a pneumatic tool. The high-pressure gas is conducted to the intake 32 of the pneumatic cylinder into the cylinder chamber 25 for driving the pneumatic cylinder.

Figure 8:
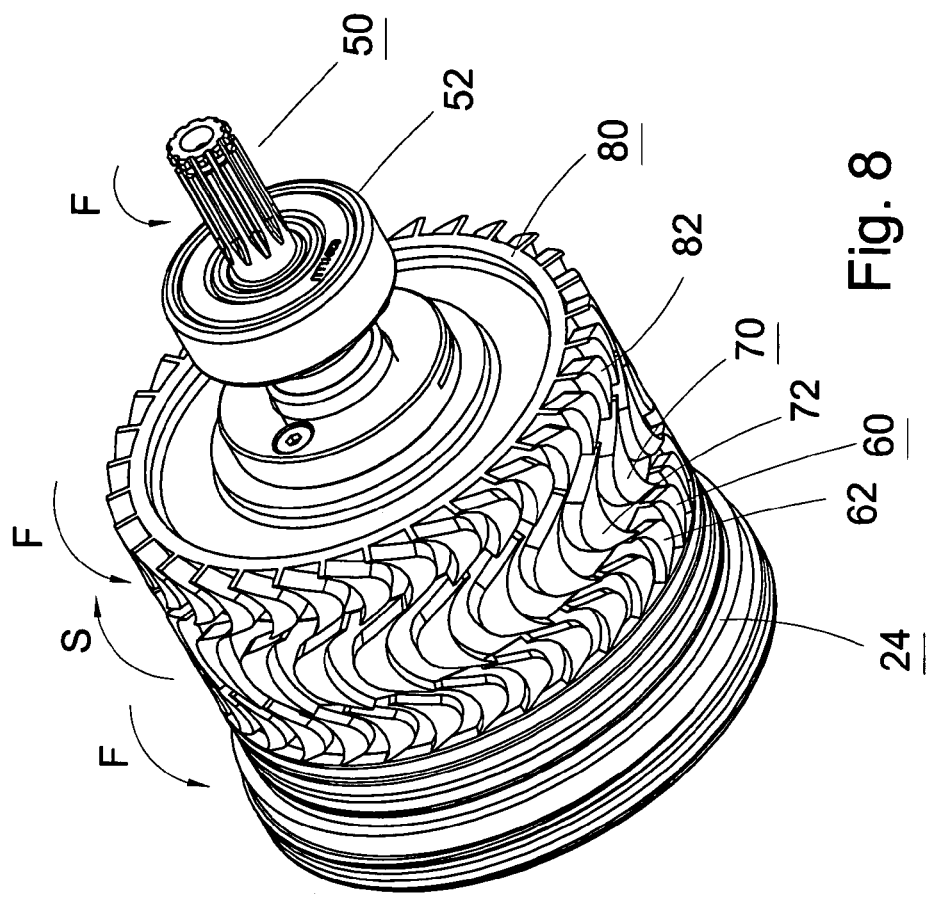
FIG. 8 is a rear perspective view of the embodiment of the present invention, in which the cylinder body is removed.

Referring to FIG. 4, when the high-pressure gas flows into the cylinder chamber 25, the gas impacts the blades 62 of the front turbine 60. Due to the configuration of the blades 62, the front turbine 60 is rotate in direction F as shown in FIG. 8. Then the airflow goes to the inverse turbine 70 to impact the blades 72 thereof. At this time, the inverse turbine 70 is rotated in direction S. Then the gas flows toward the rear turbine 80 and impacts the blades 82. At this time, the rear turbine 80 is rotate in the same direction F. Therefore, the two turbines 60, 80 and the rotary shaft 50 are rotated in the same direction, while the inverse turbine 70 is rotated in a reverse direction. The one-way bearing 75 ensures that the inverse turbine 70 can only rotate in the direction S reverse to the direction of the front and rear turbines. The airflow continuously flows between the three turbines 60, 70, 80 and eventually is exhausted from the exhaust ports 34.

After the high-pressure gas impacts the blades 62 of the front turbine 60 to rotate the same, the airflow is then conducted by the blades 62 to go to the inverse turbine 70 to impact the blades 72 thereof, and the inverse turbine 70 is rotated in the reverse direction. The blades 62 have a configuration contrary to that of the blade 72 so that the airflow applies a reverse pressure to the blades 72. Also, the blades 72 have a capacity larger than that of the blades 62 of the turbine 60 so that the airflow can effectively expand to drive the inverse turbine 70 and fast rotate the same.

Then, the airflow flows from the inverse turbine 70 to the rear turbine 80. Similarly, the turbines 70, 80 are rotated in the reverse directions. The blades 72, 82 have contrary configurations and the blades 82 have a capacity larger than that of the blades 72. Therefore, the airflow applies a reverse pressure to the blades 82 of the rear turbine and the airflow can expand to drive the blades 82 and rotate the rear turbine 80. The kinetic energy of the rear turbine will be fed back to the synchronously rotated front turbine 60 to enhance the output power of entire pneumatic cylinder.

Referring to FIG. 5, in the position of the front turbine 60, with the flow way 30 as a starting point, the cylinder housing 20 is sequentially formed with an auxiliary intake 26 and two auxiliary exhaust ports 27, 28 in the rotational direction of the front turbine. The flow way 30 is positioned between the intake 26 and the second exhaust port 28. In the beginning of rotation of the front turbine 60, the gas is not fully expanded and the rotational speed is fast, therefore, external gas will be sucked from the intake 26 into the cylinder chamber. When rotated to the exhaust ports 27, 28, the gas is expanded to a certain extent and some of the gas is exhausted through exhaust ports out of the cylinder housing 20. During the operation of the front turbine 60, a pressure drop exists between the starting position A and the ending position B. This pressure drop makes the front turbine tend to create a torque.

With the intake 26 and exhaust ports 27, 28, the pneumatic cylinder is not a close space, whereby the flowability of the gas is enhanced and the resistance against the turbines when rotating within the cylinder housing is lowered. Accordingly, the pneumatic tool will not lose the energy of the high-pressure gas by overcoming the resistance. Therefore, the pneumatic cylinder can be more efficiently driven.

Moreover, when the external gas is supplemented from the intake 26 into the pneumatic cylinder 10, the pneumatic cylinder can utilize the external gas to reduce necessary amount of the high-pressure gas. Therefore, the gas consumption of the pneumatic tool can be reduced.

When the pneumatic cylinder operates, the two turbines 60, 80 and the inverse turbine 70 are rotated at high speed in reverse directions. The spin effect exerted onto the rotary shaft by the turbines 60, 80 is just offset by the spin effect exerted onto the rotary shaft by the inverse turbine 70. Therefore, a balance is achieved to obviate the twisting of the pneumatic cylinder. Accordingly, the pneumatic tool can be steadily operated and tiredness of a user can be avoided.

The pneumatic cylinder of the present invention has no stator except the cylinder housing. That is, the front and rear turbines and the inverse turbine are all rotors. This is different from the conventional pneumatic cylinder. The inverse turbine rotates in reverse direction to enhance the kinetic energy of the airflow so as to avoid twisting of the pneumatic tool. The auxiliary intake and exhaust ports enable the pneumatic cylinder to effectively output high torque and reduce gas consumption.

It should be noted that the numbers of the front and rear turbines and the inverse turbine are not limited. For example, alternatively, the pneumatic cylinder of the present invention can have three turbines and two inverse turbines positioned between the three turbines.

The above embodiments are only used to illustrate the present invention, not intended to limit the scope thereof. Many modifications of the above embodiments can be made without departing from the spirit of the present invention.

What is claimed is:

1. A turbo pneumatic cylinder of a pneumatic tool, comprising:

a cylinder housing formed with an internal cylinder chamber; a predetermined number of intakes being on a front end of the cylinder housing, whereby high-pressure gas can flow through the intake into the cylinder chamber; a predetermined number of exhaust ports being formed on a rear end of the cylinder housing to communicate with the cylinder chamber; at least one auxiliary intake and at least one auxiliary exhaust port being formed on a wall of the cylinder housing at a certain interval for communicating the cylinder chamber with outer side;

a rotary shaft axially rotatably disposed in the cylinder housing;

a front turbine, multiple blades being arranged on a circumferences of the front turbine at equal intervals;

a rear turbine, multiple blades being arranged on a circumference of the rear turbine at equal intervals; the front and rear turbines being disposed in the cylinder chamber and fixed on the rotary shaft and synchronously rotatable therewith; the blades of the front and rear turbines being directed in the same direction; the auxiliary intake and auxiliary exhaust port being aligned with the front turbine; and a inverse turbine, multiple blades being arranged on a circumference of the inverse turbine at equal intervals, the inverse turbine being one-way rotatably fitted on the rotary shaft between the front and rear turbines, the rotational direction of the inverse turbine being reverse to the rotational direction of the front and rear turbines; the blades of the inverse turbine being directed in a direction reverse to the direction of the blades of the front and rear turbines; whereby after the high-pressure gas flows into the cylinder chamber to drive the front and rear turbines and the inverse turbine, the front and rear turbines and the rotary shaft rotate in the same direction, while the inverse turbine rotates in a direction reverse to the direction of the front and rear turbines.

2. The turbo pneumatic cylinder of the pneumatic tool as claimed in claim 1, wherein the cylinder housing is formed with at least one flow way communicating the intake with the front end of the cylinder chamber.

3. The turbo pneumatic cylinder of the pneumatic tool as claimed in claim 2, wherein a rear end of the flow way is between the auxiliary intake and the auxiliary exhaust port.

4. The turbo pneumatic cylinder of the pneumatic tool as claimed in claim 1, wherein the heights of the blades of the front turbine, the inverse turbine and the rear turbine are gradually increased from a front side of the cylinder housing to a rear side thereof.

5. The turbo pneumatic cylinder of the pneumatic tool as claimed in claim 1, wherein the inverse turbine is rotatably fitted on the rotary shaft via a one-way bearing.

6. The turbo pneumatic cylinder of the pneumatic tool as claimed in claim 1, wherein the cylinder housing is composed of a cylinder body and a cylinder cap plugged in the front end of the cylinder body; the cylinder chamber being formed in the cylinder body; the intakes being formed on the cylinder cap; the exhaust ports being formed at a rear end of the cylinder body; a flow deflector being disposed at a rear end of the cylinder cap for communicating the intake with the cylinder chamber.

7. The turbo pneumatic cylinder of the pneumatic tool as claimed in claim 6, wherein a flow way is formed at the front end of the cylinder chamber of the cylinder housing; the flow deflector having a disc section and a cylindrical section positioned on a front face of the disc section and having a smaller diameter, the disc section airtight abutting against an inner face of the wall of the cylinder chamber, the cylindrical section and the cylinder chamber defining therebetween an annular space communicating with the flow way; a circumference of the cylindrical section being formed with a predetermined number of radially inward depressions; a predetermined number of guide holes being formed on a front end face of the cylindrical section to inward extend and communicate with the depressions; front ends of the guide holes being right aligned with the intakes.

8. The turbo pneumatic cylinder of the pneumatic tool as claimed in claim 1, further comprising a second rear turbine identical to said rear turbine and fixed on the rotary shaft and synchronously rotatable therewith; a second inverse turbine identical to said inverse turbine and one-way rotatably fitted on the rotary shaft between said rear turbine and the second rear turbines, the rotational direction of the second inverse turbine being reverse to the rotational direction of the front and rear turbines.

9. The turbo pneumatic cylinder of the pneumatic tool as claimed in claim 1, wherein the heights of the blades of the turbines are gradually increased from a front side to a rear side.

10. The turbo pneumatic cylinder of the pneumatic tool as claimed in claim 9, wherein the depths of the blades of the inverse turbine are increased from the front side to the rear side.

11. The turbo pneumatic cylinder of the pneumatic tool as claimed in claim 9, wherein the depths of the blades of the turbines are increased from the front side to the rear side.

\* \* \* \* \*